United States Patent
Buckingham et al.

(10) Patent No.: US 6,861,086 B2
(45) Date of Patent: Mar. 1, 2005

(54) METHOD OF PROCESSING ROASTED COFFEE

(75) Inventors: Robert Buckingham, Whitby (CA); Willem Anker, Port Perry (CA)

(73) Assignee: 1361215 Ontario, Inc., Pickering (CA)

( * ) Notice: Subject to any disclaimer, the term of this patent is extended or adjusted under 35 U.S.C. 154(b) by 451 days.

(21) Appl. No.: 09/782,314

(22) Filed: Feb. 14, 2001

(65) Prior Publication Data

US 2002/0110626 A1 Aug. 15, 2002

(51) Int. Cl.$^7$ .................................................. A23F 5/04
(52) U.S. Cl. ....................... 426/594; 426/395; 426/397; 426/419; 426/594
(58) Field of Search ................ 426/395, 397, 426/419, 466, 594, 595

(56) References Cited

U.S. PATENT DOCUMENTS

| | | | | |
|---|---|---|---|---|
| 3,789,888 A | * | 2/1974 | James et al. | |
| 4,004,398 A | * | 1/1977 | Larsson et al. | |
| 4,069,349 A | * | 1/1978 | Shaw | |
| 4,078,356 A | * | 3/1978 | Gallo et al. | |
| 4,804,550 A | * | 2/1989 | Bardsley et al. | |
| 4,957,753 A | * | 9/1990 | Bardsley et al. | |
| 5,368,875 A | * | 11/1994 | Hibi et al. | |
| 5,532,011 A | * | 7/1996 | Goglio | |
| 5,768,859 A | * | 6/1998 | Goglio | |
| 5,916,110 A | | 6/1999 | Sanfilippo et al. | |

FOREIGN PATENT DOCUMENTS

| | | |
|---|---|---|
| CH | 217469 | 10/1941 |
| EP | 0 638 479 A1 | 2/1995 |
| FR | 750 228 | 2/1933 |

\* cited by examiner

*Primary Examiner*—Carolyn Paden
(74) *Attorney, Agent, or Firm*—Merek, Blackmon & Voorhees, LLC

(57) ABSTRACT

A method of processing roasted coffee to improve the retention of carbon dioxide and aromatics liberated from the roasted coffee. The method involves preparing one or more containers for receiving coffee. The containers are purged of contained air through flushing with an inert gas. Roasted coffee is transported and delivered to a grinding circuit where it is ground directly into a container filling apparatus. The container filling filling apparatus delivers the ground coffee directly into the purged containers after which the containers are sealed to maximize the retention of carbon dioxide and aromatics liberated from the roasted coffee and to minimize contact of the ground roasted coffee with the air.

13 Claims, 1 Drawing Sheet

METHOD OF PROCESSING ROASTED COFFEE

FIELD OF THE INVENTION

This invention relates to a method of processing coffee, and in particular a method of processing and packaging coffee that has undergone a roasting process.

BACKGROUND OF THE INVENTION

In the processing of coffee, typically the first step is to subject green coffee beans to a roasting process. This process causes thermal decomposition and chemical changes within the beans at which time the familiar aroma and flavour development occurs. A by-product of the roasting process is carbon dioxide gas. Following roasting, coffee almost immediately begins to release carbon dioxide. When in the whole bean state the release of carbon dioxide gas is relatively slow. In some cases it may take in excess of two weeks for all internal carbon dioxide gas built up during the roasting process to be released. In contrast, grinding coffee beans to produce ground roasted coffee results in the release of carbon dioxide and volatile aromatics over a much shortened time frame.

As a result of the discharge of carbon dioxide gas, tightly packaged coffee that has not been sufficiently degassed can cause an undesired expansion (and in some cases rupture) of packaging materials. For that reason both roasted coffee beans and ground roasted coffee are commonly transported and stored in bins or open containers following the roasting/grinding process where they are allowed to degas for anywhere from a few hours to upwards of one to two days so that the product that is eventually packaged is essentially carbon dioxide free.

Ground roasted coffee also readily absorbs atmospheric moisture and is a good desiccant. In addition, whether it be whole bean or ground, roasted coffee oxidizes when it comes into contact with air, resulting in increased levels of acidity and a general degradation in taste. For these reasons, after being sufficiently degassed coffee is often vacuum packaged in a tightly sealed container to avoid continued contact with air. Alternately, coffee is sometimes packaged in a nitrogen filled container in order to avoid oxidation through contact with air.

Unfortunately, the above described methods of processing roasted coffee suffer from a number of substantial draw backs that affect the flavour and aroma of the coffee, and ultimately its price and desirability to consumers. First, degassing coffee increases exposure of the coffee to air and results in enhanced oxidation. Commonly used bulk handling techniques further exasperate the oxidation problem by increasing the contact of the roasted coffee with air. In addition, typical bulk handling equipment that is used in coffee processing (for example conveyor belts, screw conveyors, air conveyors etc.) have a tendency to separate fine and coarse particles and can result in an uneven mixing of fine and coarse particles within individual packaged portions. Ground coffee that is allowed to come into contact with air for any extended length of time runs the risk of absorbing moisture from the atmosphere causing a reduction in the quality of the coffee.

It has also been found that a substantial portion of the aromatics associated with roasted coffee are stripped off from either the whole bean or the ground product when the carbon dioxide liberated from the coffee is removed. Appreciating that a significant loss of the aromatics from roasted coffee results in a degradation of the coffee's flavour and taste, others have developed elaborate systems that attempt to capture volatile aromatics, and later condense and process them for use in the production of instant coffee crystals.

Finally, a further limitation associated with current coffee processing methods concerns the common practice of vacuum packaging coffee. Where coffee has been packaged within a container under a vacuum environment, immediately upon opening the container the coffee is instantly, and forcefully, aerated causing enhanced and accelerated oxidation.

There is therefore a need for an improved method of processing roasted coffee that addresses a number of the limitations present in such methods as are currently in use.

SUMMARY OF THE INVENTION

The invention therefore provides a method of processing roasted coffee that provides a means to minimize oxidation, maximize the retention of volatile aromatics, minimize moisture absorption and helps to minimize the separation of fine and course particles in the event that the coffee is subjected to a grinding process.

Accordingly, in one of its aspects the invention provides a method of processing roasted coffee to improve the retention of carbon dioxide and aromatics liberated from the roasted coffee, the method comprising the steps of preparing one or more containers for receiving coffee therein; purging said containers of contained air through flushing said containers with an inert gas; transporting and delivering roasted coffee to a grinding circuit; grinding said roasted coffee directly into a container filling apparatus; with said container filling apparatus, delivering said ground coffee directly into said purged containers; and, sealing said containers to maximize the retention of carbon dioxide and aromatics liberated from said roasted coffee and to minimize contact of said ground roasted coffee with the air.

In a further aspect the invention provides a method of processing roasted coffee beans to minimize the loss of carbon dioxide and aromatics liberated from the coffee beans following roasting, the method comprising the steps of preparing one or more containers for receiving roasted coffee beans therein, purging said containers of contained air through flushing with an inert gas and thereafter maintaining said purged containers in a generally upright position with said inert gas retained therein to prevent the influx of air into said purged containers, without delay and without allowing said roasted coffee beans to accumulate in storage bins or staging areas transporting and delivering said roasted coffee beans directly to a container filling apparatus, with said container filling apparatus delivering said roasted coffee beans directly into said purged containers, and, thereafter, sealing said containers to maximize the retention of carbon dioxide and aromatics liberated from said roasted coffee beans and to minimize contact of said roasted coffee beans with the air.

In yet a further aspect the invention provides a method of processing roasted coffee to minimize the loss of carbon dioxide gas and aromatics liberated from the coffee, the method comprising the steps of preparing one or more containers for receiving roasted coffee therein, purging said containers of contained air through flushing with an inert gas and maintaining said purged containers in a generally upright position with said inert gas retained therein, transporting and delivering roasted coffee to a grinding circuit located within an enclosure having an oxygen depleted atmosphere, grinding said coffee directly into a container filling apparatus, with said container filling apparatus delivering said ground coffee directly into said purged containers, sealing said containers to maximize the retention of carbon dioxide and aromatics liberated from said roasted coffee and to minimize the contact of said roasted coffee with the air, said steps of said method completed with minimal delay between successive steps to minimize the loss of carbon dioxide gas liberated from said coffee prior to the sealing of said coffee within said containers.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
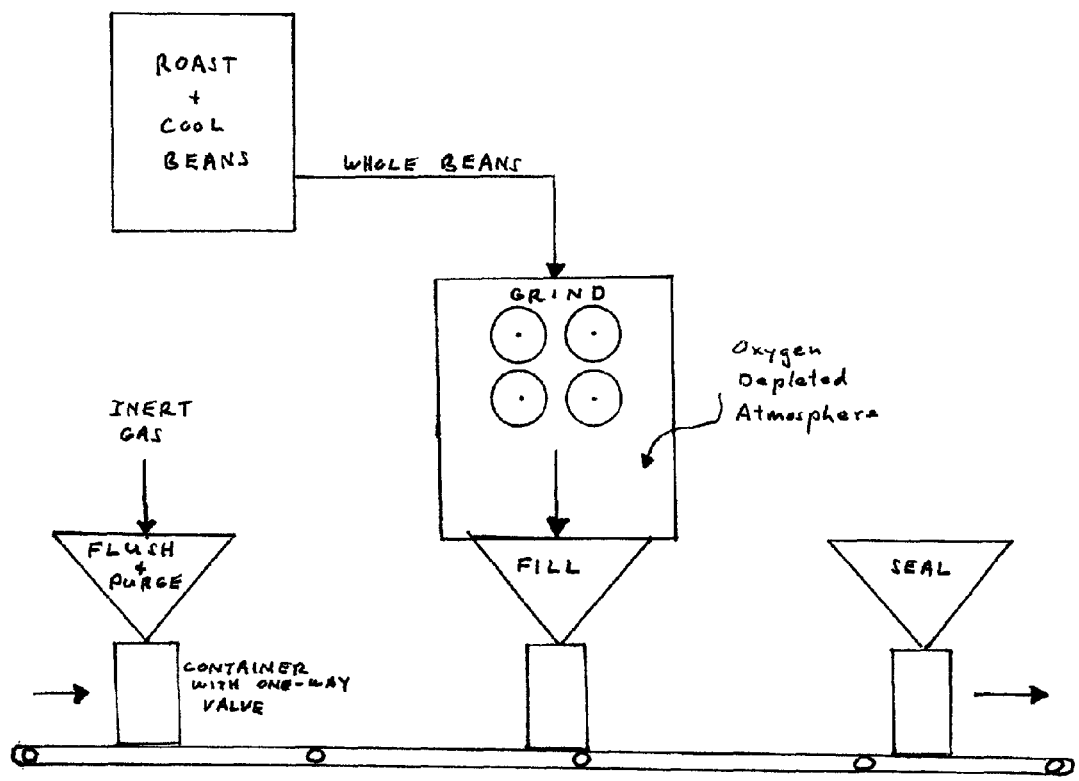
FIG. 1 is a schematic drawing that graphically depicts the primary stages of one of the embodiments of the preferred method according to the present invention.

The present invention may be embodied in a number of different forms. However, the specification and drawings that follow describe and disclose only some of the specific forms of the invention and are not intended to limit the scope of the invention as defined in the claims that follow herein.

According to the method of the present invention, one or more containers are prepared for receiving and packaging coffee therein. Depending upon the end use of the packaged coffee, shipping requirements, retail display considerations and other factors, it will be appreciated that a wide variety of different containers or packages may be utilized. For example, the containers may be of a rigid variety formed from metallic alloys, cellulose products, and/or plastics or other synthetic materials. Similarly, the containers may also be of a flexible or semi-rigid variety, including pre-formed synthetic bags, or bags made from cellulose or other textile materials coated for gas impermeability. In other instances the containers may be constructed from continuous rolls of plastic or other synthetic material that are cut and hermetically sealed to desired sizes in what is often referred to as a form, fill and seal circuit. Regardless of the particular form of container utilized, the preparation of the containers for receiving coffee typically involves the placement of the containers on a conveyor belt or other assembly system such that they can be filled and sealed or form filled and sealed in an efficient and timely fashion.

The preparation of the containers for receiving coffee pursuant to a preferred embodiment of the present invention includes purging the containers of contained air through flushing with an inert gas. Most commonly inert gas would be supplied to the containers through a series of flushing lines directed into the containers while on the assembly line of a processing plant operation. The inert gas used to purge the containers in many cases will have a density either exceeding or relatively close to that of air. Once flushed and purged, the containers proceed through subsequent processing stages in a generally upright orientation to allow the inert gas to remain within the interior of the containers, thereby preventing the influx of air. While a variety of different non-toxic inert gases could be utilized, due to its general availability and relative inexpense, in a preferred embodiment of the invention nitrogen gas is used to purge the containers.

The method of the present invention also calls for the transporting and delivering of roasted coffee to a grinding circuit in one embodiment, or for transporting and delivering whole roasted coffee beans directly to a container filling apparatus in an alternate embodiment. Through a thorough understanding of the invention it will be appreciated that the invention is independent of the precise roasting method that is employed, and that a variety of different methods of roasting and roasting equipment could be used. For example, a typical roasting process could involve subjecting green coffee beans to temperatures of between approximately 390 and 460 degrees Fahrenheit causing pyrolysis or thermal decomposition within the beans. At elevated temperatures in this range water is evaporated from the beans followed by pyrolysis causing chemical changes within the bean that result in the familiar aroma and flavour of roasted coffee. During the pyrolysis process carbon dioxide gas is formed and typically builds up within internal cavities in the coffee beans.

The specific target temperature to which the coffee beans are elevated and the length of time that they are maintained at that temperature can vary dramatically depending upon the nature and origin of the beans and the desired flavour and colour of the end product. In general, higher roasting temperatures maintained for longer lengths of time result in a somewhat stronger, more robust and darker flavoured coffee. In any event, once the coffee has reached a specific target temperature and has been maintained at that level for the desired length of time the coffee is typically quenched to slow down or retard the pyrolysis reaction. Again the specific method of quenching the roasted coffee may vary broadly, however, typically the hot roasted coffee beans are passed through a cooling chamber where their temperature is reduced through exposure to air, or through quenching with water or or an inert gas such as nitrogen.

In accordance with the present invention the coffee exiting the roasting process is preferably quenched and cooled to a temperature of between approximately 80 and 150 degrees Fahrenheit. Thereafter, in one preferred embodiment the roasted coffee beans are quickly transported and delivered to a grinding circuit to reduce the coffee to granules of a desired size range. The roasted beans are preferably delivered to the grinding circuit without delay to avoid loss of carbon dioxide and to minimize oxidation. As a means to minimize the contact of the beans with air, they may be transported to the grinding circuit in an oxygen depleted environment. Such an environment can be attained through the use of a screw conveyor, by injecting or blowing carbon dioxide or an inert gas onto the beans during transport, or through transporting the coffee within a sealed enclosure where the oxygen has been removed or depleted.

When delivered to the grinding circuit the extent to which the coffee is ground will be to a large part dependent upon the coffee's end use. For most residential and commercial uses a granule size of between approximately 0.01 inches and 0.1 inches (Tyler screen size of between #10 and #50 mesh) is sufficient. The particular type of grinding equipment that is utilized has little, if any, bearing upon the invention. Practically any commonly used coffee grinding apparatus could be used. It is expected that in most instances the coffee beans will be ground through the use of a traditional roller mill.

Since the grinding of roasted coffee beans accelerates the release of carbon dioxide, in the preferred embodiment of the present inventive method the beans are ground to within their desired size range and deposited immediately and directly into a container filling apparatus that delivers the ground coffee directly into the previously prepared and purged containers. Preferably the grinding circuit is positioned immediately above the filling apparatus such that the ground coffee granules fall directly into the filler apparatus as they exit the grinding and sizing machinery. Essentially, the coffee is "ground" directly into the filling apparatus. Once received within the filling apparatus, the ground roasted coffee is delivered directly to the purged containers by way of a screw conveyor, through a gravity feed mechanism, or through a feeding weigh scale apparatus that deposits coffee into the containers on the basis of weight as opposed to volume.

It has been found that in some cases the liberation of carbon dioxide gas from the ground coffee may be significant enough to remove the necessity of purging the containers. In such instances the coffee is ground directly into upright containers that have not been previously flushed with inert gas. Being more dense than air, the carbon dioxide given off by the ground coffee displaces air within the container until the container is essentially oxygen free. With the liberation of carbon dioxide from the coffee generally enhanced at elevated temperatures, the containers may also be heated or cooled as required to stabilize carbon dioxide production and to assist in controlling the amount of oxygen within the container.

When coffee is ground not only is the liberation and loss of the carbon dioxide greatly accelerated, so to is the potential for oxidation. For that reason under the present method there is preferably no airveying or conveying of ground coffee through the use of conveyor belts or similar commonly used bulk handling equipment that expose the product to the air. To further reduce oxidation and enhance carbon dioxide retention, an external source of carbon dioxide or inert gas may be supplied to the grinding and/or filling circuits. Blowing carbon dioxide or inert gas into grinding and/or filling circuits tends to reduce oxygen levels within the working environment and minimize the contact of the coffee with oxygen present in the air.

Alternately, the grinding and/or filling stages may be carried out within sealed enclosures that either have substantially all of the oxygen within them removed or that operate in a modified oxygen depleted atmosphere. Typically where the grinding and/or filling stages are enclosed, they would be vacuumed or flushed with carbon dioxide or an inert gas (such as nitrogen) to remove or reduce oxygen levels. Thereafter, once grinding and filling commences the natural liberation of carbon dioxide from the coffee will have a tendency of maintaining a zero, or a substantially depleted, oxygen level within the immediate atmosphere surrounding the coffee.

It will be appreciated by those skilled in the art that the above described process may be repeated for whole bean coffee processing, with the exclusion of the grinding stage. When processing whole bean coffee, the roasted beans are transported and delivered directly to the container filling apparatus for deposition within the containers in the same fashion as described above with respect to ground roasted coffee. Once again, to minimize oxidation and the retention of carbon dioxide and aromatics, the roasted beans are delivered from the roasting circuit to the container filling apparatus without delay, and without allowing the beans to accumulate in storage bins or staging areas as has traditionally been the practice when degassing. In addition, and as in the case of the method of processing ground coffee described above, the beans may be transported from the roasting circuit to the subsequent container filling apparatus in an oxygen depleted environment. This may be accomplished through the use of enclosed screw conveyors, by injecting carbon dioxide or inert gases into the bean transportation circuit, or by transporting the beans from the roasting to the filling stages within a sealed enclosure which the oxygen has been removed or depleted.

Whether handling whole roasted coffee beans or ground roasted coffee, following deposition of the coffee within the previously prepared and purged containers the containers are thereafter sealed to maximize the retention of carbon dioxide and aromatics liberated from the coffee, and to minimize contact of the coffee with air. Depending upon the particular construction of the container, the method of sealing may vary. For example, where the containers are rigid and formed from metal alloys, cellulose, or synthetic plastics, rigid lids may be applied through methods commonly used in the canning and packaging industries. Where the containers are in the form of flexible synthetic bags, typically their tops would be hermetically sealed or enclosed with the use of adhesives.

Under the above described method, the amount of time from the point when coffee beans exit the roasting circuit until they are either directly packaged within containers or ground and then subsequently packaged is kept to a minimum. The roasted coffee is not allowed to sit in storage bins or staging areas to degas. For that reason the coffee will continue to liberate a significant amount of carbon dioxide gas after it has been packaged and sealed within its container. To accommodate this liberation of gas, in the preferred embodiment of the invention the containers are equipped with a pressure-sensitive one-way valve that permits internal gas pressure that exceeds a pre-determined value to be bled off from the interior of the container. The one-way nature of the valve also prevents the influx of air into the container and maintains a high inert gas and/or carbon dioxide environment within the container. The pressure sensitivity of the valve ensures that the valve normally remains in a closed position, in which case the integrity of the seal of the container is maintained. Only when the internal gas pressure exceeds a pre-determined value will the valve begin to slightly open to allow pressure to be bled off. It will be appreciated that the construction of the container and the materials from which it is formed will to a large extent dictate the pressure at which the one-way valve must bleed off built-up internal pressure to maintain the integrity of the container. To prevent air from entering the container the valve should be designed so that it will only open when the internal gas pressure exceeds the outside atmospheric pressure by a specified amount.

It will be appreciated from an understanding of the above description that utilization of the method to process and package either roasted coffee beans or ground roasted coffee will result in minimal oxidation of the coffee and minimal loss of liberated carbon dioxide and aromatics. Directly transporting coffee between successive stages in the process with minimal or no delays reduces the overall time from roasting to packaging to within a preferred range of from one to five minutes. Since at no point is the coffee allowed to be retained within storage bins or staging areas to degasify, the opportunity for oxidation and the loss of aromatics is significantly reduced. In addition, when processing ground coffee, grinding the coffee and depositing it immediately and directly into a filler apparatus without the employment of conveyor systems and other commonly used bulk handling machinery further and significantly reduces the time from roasting to packaging and the exposure of the coffee to air. Finally, carrying out the transportation, grinding and/or filling operations within sealed enclosures having an oxygen depleted atmosphere virtually eliminates the opportunity for any significant oxidation of the coffee before packaging and further helps to prevent the loss of liberated carbon dioxide which carries with it valuable and desirable aromatics.

As a result, coffee processed and packaged according to the described method tends to be fresher, less acidic, better tasting, and generally has a better aroma. Since the method minimizes the exposure of the roasted coffee to air, the coffee is less susceptible to the deleterious effects of moisture retention that can result through exposure to air, particularly in the case of ground roasted coffee.

It is to be understood that what has been described are the preferred embodiments of the invention and that it may be possible to make variations to these embodiments while staying within the broad scope of the invention. Some of these variations have been discussed while others will be readily apparent to those skilled in the art.

We claim:

1. A method of processing roasted coffee to improve the retention of carbon dioxide and aromatics liberated from the roasted coffee, the method comprising the steps of:
    (i) preparing one or more containers for receiving coffee therein;
    (ii) purging said containers of contained air through flushing said containers with an inert gas;
    (iii) transporting and delivering roasted coffee to a grinding circuit;
    (iv) grinding said roasted coffee directly into a container filling apparatus;
    (v) with said container filling apparatus, delivering said ground coffee directly into said purged containers; and,
    (vi) sealing said containers to maximize the retention of carbon dioxide and aromatics liberated from said roasted coffee and to minimize contact of said ground roasted coffee with the air,
wherein said step of grinding said roasted coffee directly into a container filling apparatus is carried out within a modified oxygen depleted atmosphere and said steps of grinding said roasted coffee directly into a container filling apparatus and delivering said ground coffee directly into said purged containers are completed with minimal delay between successive steps to minimize the loss of carbon dioxide gas liberated from said coffee and to minimize the degassification of said coffee prior to the sealing of said coffee within said containers.

2. The method as claimed in claim 1 including the further step of maintaining said purged containers in a generally upright position with said inert gas retained therein to thereby prevent the influx of air into said purged containers.

3. The method as claimed in claim 2 wherein said inert gas is nitrogen.

4. The method as claimed in claim 2 wherein said step of transporting and delivering roasted coffee to a grinding circuit comprises the transportation of said coffee directly from a roasting circuit with minimal delay and minimal degasification.

5. The method as claimed in claim 4 wherein said roasted coffee is transported to said grinding circuit in an oxygen depleted atmosphere.

6. The method as claimed in claim 5 wherein said containers are formed from a gas impermeable material, said step of preparing one or more containers for receiving coffee therein including the incorporation of a pressure-sensitive one-way valve within said containers, said one-way valve permitting internal gas pressure exceeding a pre-determined value to be bled off from the interior of said containers while preventing the influx of air into said containers when said containers are sealed with roasted coffee retained therein.

7. The method as claimed in claim 6 wherein said steps of grinding said roasted coffee directly into a container filling apparatus, delivering said ground coffee to said purged containers, and sealing said containers are completed within a total time frame of less than five minutes to minimize the loss of carbon dioxide and aromatics liberated from said roasted coffee.

8. The method as claimed in claim 7 wherein said coffee is ground to a size range of between approximately 0.01 and 0.1 inches.

9. The method as claimed in claim 8 wherein said coffee is quenched and cooled to a temperature of between approximately 80 and 150 degrees Fahrenheit prior to leaving said roasting circuit.

10. The method as claimed in claim 1 wherein said step of grinding said roasted coffee directly into a container filling apparatus is carried out within a sealed enclosure having substantially all of the oxygen therein removed.

11. A method of processing roasted coffee to minimize the loss of carbon dioxide gas and aromatics liberated from the coffee, the method comprising the steps of preparing one or more containers for receiving roasted coffee therein and maintaining said purged containers in a generally upright position, transporting and delivering roasted coffee to a grinding circuit located within an enclosure having an oxygen depleted atmosphere, grinding said coffee directly into a container filling apparatus, with said container filling apparatus delivering said ground coffee directly into said purged containers, sealing said containers to maximize the retention of carbon dioxide and aromatics liberated from said roasted coffee and to minimize the contact of said roasted coffee with the air, said steps of said method completed with minimal delay between successive steps to minimize the degassification of said coffee prior to the sealing of said coffee within said containers, said step of grinding said roasted coffee directly into a container filling apparatus carried out within a modified oxygen depleted atmosphere.

12. The method as claimed in claim 11 including the further step of purging said containers of contained air through flushing with an inert gas.

13. The method as claimed in claim 11 wherein contained air is displaced from within said containers by carbon dioxide liberated from said ground roasted coffee delivered to said containers.

* * * * *